Dec. 27, 1955     R. C. M. E. GRANDADAM     2,728,523
OUTPUT CALCULATOR FOR MACHINE TOOLS
Filed June 19, 1951     2 Sheets-Sheet 1
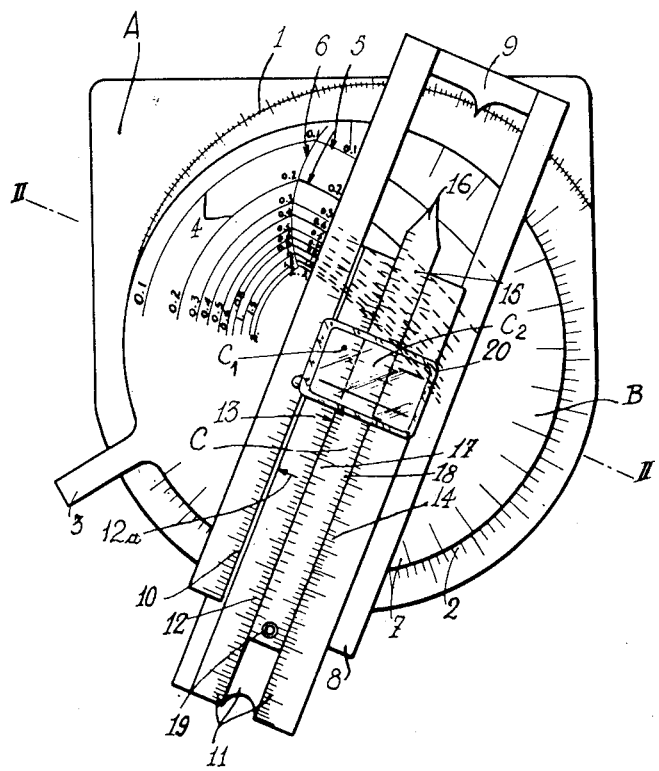
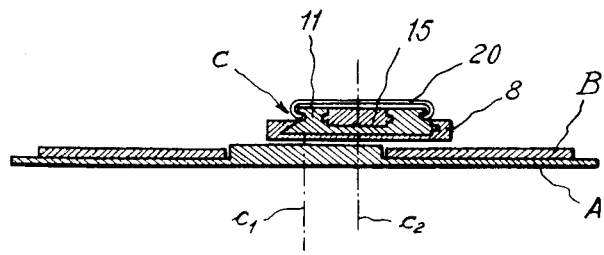
INVENTOR.
ROGER CHARLES MARIE EMILE GRANDADAM
ATTORNEY Dec. 27, 1955 R. C. M. E. GRANDADAM 2,728,523
OUTPUT CALCULATOR FOR MACHINE TOOLS
Filed June 19, 1951 2 Sheets-Sheet 2
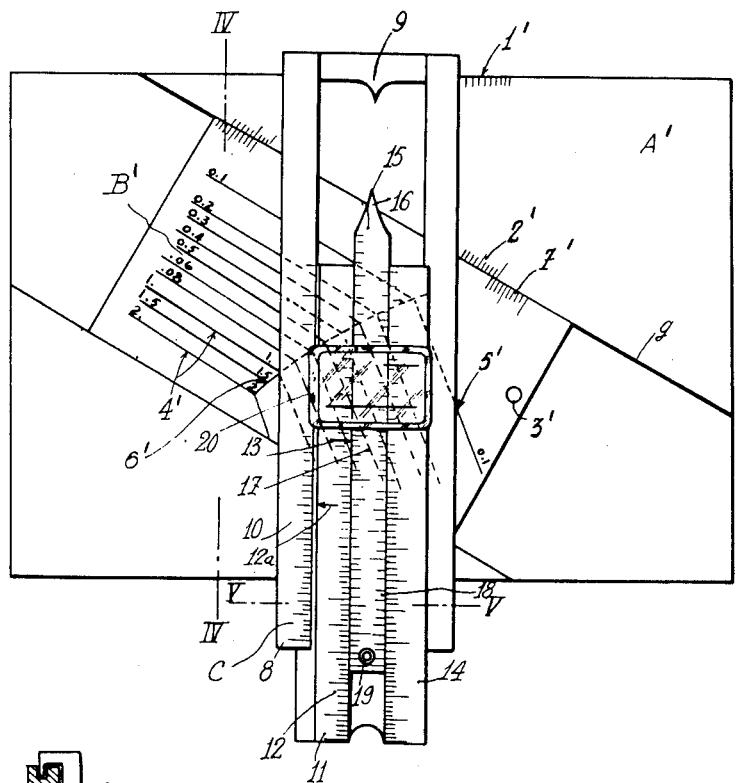
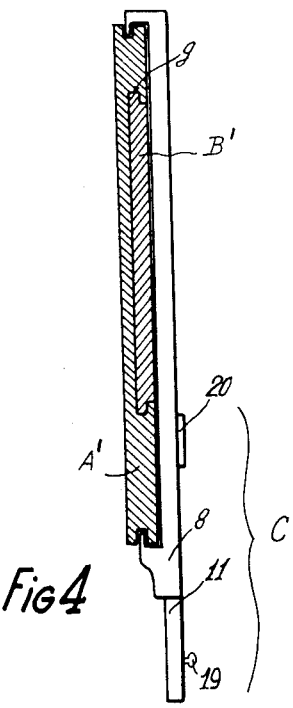
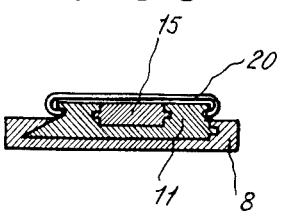
INVENTOR.
ROGER CHARLES MARIE EMILE GRANDADAM
ATTORNEY

United States Patent Office 2,728,523
Patented Dec. 27, 1955

2,728,523
OUTPUT CALCULATOR FOR MACHINE TOOLS

Roger Charles Marie Emile Grandadam, Vandoeuvre, France

Application June 19, 1951, Serial No. 232,301

Claims priority, application France June 29, 1950

13 Claims. (Cl. 235—61)

The present invention relates to an output indicating device which by determining directly and precisely the allotment of operational tasks to various machine tools and their adjustment, enables the highest possible output in a tool room to be obtained.

Generally speaking, the output indicating device for machine tools according to the present invention makes possible the quick and direct solution of all normally occurring problems of machining having regard to the proper utilisation of the tools, to the dynamic characteristics of the machines, and to the flexibility of the work pieces or their mounting.

The hitherto known devices or slide rules permit the determination of adjustments which have to be carried out on a machine in order to ensure the proper utilization of a single tool. In some of these devices the dynamic characteristics of the machine can only be included in the calculations in an inaccurate and arbitrary manner only, without regard to the flexibility of the work pieces or to their mounting. For this reason these slide rules do not make possible the allotment of operational tasks in a scientific manner. The allotment of operational tasks is left to the attention of technicians and depends on their professional knowledge and experience, with the result that the best possible output is never achieved.

The present invention has been developed with the general objects of ensuring the best possible allotment of operational tasks to the various machine tools in a factory; ascertaining the adjustments which have to be made on each machine in order to achieve the operational task in the shortest possible time; ascertaining the nature and quality of the tool which should be used for the given operational task in order to achieve it in the shortest possible time and with the lowest possible wear and tear of the tool, and ascertaining the necessary time for each operation or group of operations for any length of machining.

A device according to the invention has the feature that once it has been adjusted, it suffices to register the data of a problem whereupon the desired results can be read directly; thirty seconds suffice for solving any machining problem, including the time necessary for the adjustment of the device.

One device according to the invention is shown diagrammatically by way of example in the accompanying drawing in which:

Figure 1 is a front view of the new device,

Figure 2 is a sectional view along the line II—II in Figure 1,

Figure 3 is a view similar to that in Figure 1, of an alternative form of the device, and Figures 4 and 5 are sectional views along the lines IV—IV and V—V in Figure 3 respectively.

As shown in Figures 1 and 2 of the drawing, the device comprises a flat base plate A of any suitable shape which is provided with a logarithmic scale 1 representing "depth of cut" and with another logarithmic scale 2 representing the characteristic coefficients $R_2$ of the metals to be machined depending on the tools.

On the base plate there is mounted a movable disc B rotatable about its center $C_1$ by means of a lever 3 or by any other means capable of imparting rotary motion thereto. This disc is provided with a curve assembly 4 composed of a series of curves which are calibrated with the figures 0.1, 0.2, etc. until 2 to indicate the extent of feed per revolution: curves 4 are arcs concentric with disc B. The figures indicated on each curve represent advances in units of lengths per turn, for example, cm. per turn, or inches per turn. This curve assembly therefore represents the proper utilisation of the tools. The disc B is further provided with a second curve assembly 5 which represents the total utilisation of the productive capacity of the machine: the calibration of this scale also being in terms of extent of feed per revolution. Some lines of the latter scale are specially marked to permit of the adjustment of the device for the solution of problems connected with semi-rigid and flexible work pieces or mountings. The spaces between curves 4 and 5 respectfully follow a logarithmic progression.

A curve 6 connects intersecting points of the lines of the same feed of the two scales.

The disc B is further provided with a logarithmic scale 7 representing "productive capacity."

Above the disc B is disposed a threefold sliding rule C comprising a base 8 rotatable round a pivot $C_2$ which is placed eccentrically with regard to the centre $C_1$ of the disc B, the amount and the direction of the eccentricity being such as to make possible the solving of the problems.

The basic frame 8 of the slide-rule has an indicator 9 for the reading of the depth of cut and one of its longitudinal sides is provided with a logarithmic scale 10, representing "characteristic coefficients $R_1$ of the tools for machining the material."

A rule 11 is slidably mounted in the basic frame 8, and is provided on one of its longitudinal sides with a logarithmic scale 12 representing "speeds." This scale is provided with a datum mark 12a for the reading of the coefficients $R_1$ and with a second datum mark 13 for the reading of cutting speeds in metres per minute. On its other longitudinal side this rule 11 is provided with a logarithmic scale 14 representing "machining time."

Within the rule 11 there is slidably mounted a small rule 15 having an indicator 16 for indicating any point on the movable disc B.

The small rule 15 is provided along one of its longitudinal sides with a logarithmic scale 17 representing "diameters and lengths," and along its other longitudinal side with a logarithmic scale 18 representing "feeding for calculating time."

By means of the knob 19 the small rule 15 can easily be moved and the assembly C rotated.

The glass cursor 20 is provided with two datum marks and is slidable along the rule.

The rear surface of the device is provided with a table of the coefficients $R_1$ and $R_2$ with cross-references to corresponding figures on the scales 10 and 2 for the utilisation of the tools, having regard to the machining of various materials for various cutting periods of the tools. This table contains also recommendations for the adjustment of the device for machining semi-rigid and flexible work pieces with overhanging mountings or assemblies.

The following examples of the solution of various problems by means of the device according to the present invention will illustrate the function of the various members and will also enable the advantages of this device to be realised.

*Problem 1.*—Allotment of operational tasks. It has to be decided which machine is to be alloted a given operational task in order to ensure that it is carried out within the shortest possible time to permit of the highest possible total output of the factory.

In order to solve this problem, it is necessary to ascertain the dynamic characteristics of the machine required and of the productive power necessary to carry out the machining within the shortest possible time while ensuring at the same time proper utilisation of the chosen tools.

Information is required first concerning the dimensions and the qualities of the material of the workpiece.

Secondly it is required to know the quantity of the material to be removed in the machining operation and the quality desired in the finished surface. Accuracy of reading is not required; it depends on the professional skill of the workman and on the precision of the machine which is to be selected among the machines possessing the dynamic characteristics determined by the solution of the given problem. The same applies to the dimensional characteristics of the machine.

To solve the problem, it is first necessary to read off from the table on the rear face of the device the minimum coefficients $R_1$ and $R_2$ for the machining of the material of the work piece.

The relative movement of rule bar unit 8 has the purpose to put this rule bar unit in a position corresponding to parameter R, i. e., to cause this parameter to be inserted in the position of the triple rule bar assembly.

The coefficient $R_1$ on the threefold rule is now transferred by sliding the rule 11 until the datum-mark 12a is opposite the figure on the scale 10 which corresponds to $R_1$. The value of the coefficient $R_2$ is mentally noted. The table on the rear of the device is now referred to and the section corresponding to the adjustment of the device in regard to the flexibility of the work piece is discovered; this ratio is indicated by the dimensions of the work piece which characterise its flexibility, e. g. in the case of a shaft the ratio of its diameter to its length.

The indicator 9 is now set against a figure of the scale 1 so that it registers a particular depth of cut, such that its product with the feed to be registered, as explained later, indicates the section of the device to be read as indicated.

The small rule 15 is now moved, and the disc B is rotated in such a manner that the indicator 16 points to the selected curve of feed to indicate the datum-mark ascertained on the curve 5 as corresponding to the degree of flexibility of the work piece.

The device is now adjusted for solving the particular given problem. Each of the figures on the scales identified by the indicator 16 represents one possible solution of the given problem of machining.

Transfer the value of the depth of the material to be removed from the smallest diameter of the piece by rotating the assembly C in such a way as to bring the indicator 9 opposite the chosen figure on the scale 1; and slide the small rule 15 so as to bring the indicator onto the curve 6.

The solution of the given problem can now be read off as follows:

(a) Opposite the figure $R_2$ on scale 2, the necessary and sufficient productive power of the machine being indicated on the scale 7 of the disc.

(b) As indicated by the indicator 16, the feed which the machine should be able to make.

(c) Opposite the minimum diameter of the work piece transferred to the scale 17 of the small rule, the maximum speed of the machine, as read off on the scale 12.

There are two possible alternatives. When the depth of cut has been registered as explained and the small rule 15 has been moved, it may happen that the indicator 16 does not intersect the curve 6.

*First alternative.*—The indicator 16 of the small rule rests on the scale 4. This means that it is impossible to find the best possible solution of the given problem if a tool corresponding to the chosen coefficients $R_1$ and $R_2$ is used, it being necessary to choose some other tool, as explained in connection with problem 3, or else to choose some other cutting period of the tool during the machining.

*Second alternative.*—The indicator 16 rests on the curve assembly 5 but does not intersect the curve 6. This means that the depth of cut is too large. Any one of the solutions ascertained on this scale however is possible and solves the problem. In order to achieve an efficient cut it is however advisable to choose two or three different depths of cut each of which is determined by the indicator 16 on the curve 6.

In any one of the above-mentioned alternatives, the solution arrived at and indicating the characteristics of the machine is the only proper solution of the given problem, having regard to the desired quality of the surface finish of the work piece.

*Problem 2.*—Determination of the adjustments which it is necessary to make to a machine in order to accomplish the machining operation within the shortest possible time.

Information is required concerning the productive capacity of the machine, its range of speeds, and its range of feeds.

Also the dimensions and material of the work piece must be known.

The tool which has the qualities needed for the machining of the material is characterised by the length of time required to make a cut.

To solve the problem it is necessary to ascertain all possible combinations of the following factors: namely, speed, depth of cut, and feed, which would make possible the solution of the problem. Among these solutions it will be necessary carefully to make a choice which should be influenced by technical aspects of the various machining operations, having regard to the quantity of material to be removed and the desired quality of surface finish, the possible limits of the range of the machine, and the like.

First ascertain on the rear of the device the coefficients $R_1$ and $R_2$ which correspond to the tool chosen for the machining of the material and for the duration of the cut desired.

Obtain on the threefold rule the coefficient $R_1$ in the above described manner, and place the number of the scale 7 corresponding to the productive power of the machine opposite the respective value of $R_2$, read on the scale 2, by rotating the disc B.

The device is now set. Rotate the threefold rule and slide the small rule 15 so that the indicator 16 describes a trajectory of the curve 6.

Curve 6 is obtained by joining by means of a continuous line the points of intersection of each of the curves of the same value of curve assemblies 4 and 5.

The fact that coefficient $R_1$ has been inscribed, and then the fact that the power of production of the machine is on the face of $R_2$, translates the setting into a determined position of curve 6.

By placing the index of rule 16 upon one of the points of that curve 6 the solution of the problem posed is obtained by reading the following:

Depth of cut is on scale 1. Advance is on curve 6 by interpolating the values in case the index of rule bar 16 is located between two numeralized points. Speed is on scale 12 taken as a function of the diameter found on scale 17. Any one of the points on this curve pointed out by the indicator 16 gives one possible solution of the problem. For each of these points one can ascertain (a) the permissible depth of the cut, on the scale 1 as indicated by the datum-mark 9; (b) the feed as pointed by the indicator 16 of the small rule; (c) the speed on the scale 12 as a function of the diameter of the work piece or the speed of rotation of the tools. Furthermore, the speed of the cut in metres per minute on the scale 17 is indicated by the datum-mark 13.

If an accurate value for one of these four values is chosen, the other three values can be ascertained, and represent the only possible combination for the complete solution of the given problem.

If for technical reasons two of these values are accurately chosen, the other two values can likewise be ascertained, but the following three circumstances have to be taken into consideration:

(a) If the indicator 16 rests on the curve 6, the solution obtained is an optimum, and is the only possible one for the complete solution of the problem.

(b) If the indicator 16 rests on the curves 4, the choice of the tool made is correct, but the machine will not be utilised to its full capacity. In this case it is advisable to find a tool of a superior quality or one which can perform under more exacting conditions of work.

(c) If the indicator 16 rests on the curves 5, the machine will be utilised to the full extent of its capacity, but the tool will not be utilised to the full extent anticipated of its possible capacity. Notwithstanding this circumstance however the solution found will solve the problem of the minimum possible time for the machining of the work piece and of the possible maximum utilisation of the capacity of the whole assembly of machines, provided that the operational tasks have been allotted in advance as indicated in connection with problem 1. In this case the explanations given in connection with problem 3 will make it possible to find out if necessary which tool is best adapted to the given conditions of work.

*Problem 3.*—It is required to ascertain the quality of the tool needed for achieving the required machining in the minimum time and with the minimum wear and tear.

The desired machining is defined for the given quality of the material by the depth of the cut and the feed corresponding to the desired quality of the surface finish. The machining time will be the shortest possible, if the highest possible speed permitted is applied in view of the range of speeds or with regard to the work piece (flexible pieces, problem 1).

*Solution.*—The small rule 15 is moved so as to bring the diameter of the pieces or of the tools (scale 17) opposite the highest permissible speed (scale 12). The depth of cut value is ascertained by bringing datum-mark 9 opposite the chosen figure on the scale 1. The rule 11 together with small rule 15 are together moved without changing their relative positions, so as to bring the pointer 16 on the curve 6 to the point of the feed required by the quality of the surface, rotating the disc if necessary. The value of the coefficient R indicated by the datum-mark 12a is now read.

By means of the table on the rear of the device having regard to the quality of the material to be machined, that one of the known tools which promises the solution of the problem is selected, by comparing the available values of $R_1$ with the value of the coefficient $R_1$ ascertained.

The tool which offers the nearest value of the coefficient $R_1$ is the one to be chosen.

*Problem 4.*—It is required to determine the time required for the operation of the machine. The longer datum-mark of the cursor is brought into coincidence with the value of the speed ascertained in connection with the preceding problems (scale 12). The small ruler 15 is now moved so as to bring the ascertained feed value, as read off the scale 18, underneath the main datum-mark of the cursor. The cursor is now moved so as to bring its longer datum-mark over the length of cut value read on the scale 17.

The length of time of the operation will then be indicated on the scale 14 by the longer datum-mark of the cursor in hundredths of an hour, and by the smaller datum-mark of the cursor in minutes.

In the calibration of the device prior to attempting the solution of these problems, the values characterizing the limit of operations should be entered on the device and the value of the output of each machine should be ascertained, which value will then be used for all the calculations.

*Alternatives.*—The device according to the present invention may be modified alternatively as follows:

By use of cartesian coordinates for the solution of the same problems.

In this modification the device is as shown in Figures 3 and 4 of accompanying drawing and comprises a frame A' which is provided with a logarithmic scale 1' representing "depths," with a decimal or logarithmic scale 2' representing "coefficients $R_2$," and with a guide g for the slide B', the latter being provided with a scale 4' consisting of lines extending parallel to the guide g and numbered to represent different feeds: this curve assembly 4' represents "correct use of tools."

The second curve assembly 5' represents "Total utilization of the productive capacity of the machine"; its lines are numbered so as to represent different feeds. In this case curve assemblies 4' and 5' represent parallel straight lines with one of the curve assemblies 4' parallel to the movement of slide 13.

The curve 6' connects the points of intersection of the lines of the same feed on the curve assemblies 4' and 5'.

The logarithmic scale 7' represents productive capacity.

A threefold slide-rule 8—11—17, similar to that described previously, but arranged for sliding movement instead of being rotatable round a pivot, is mounted on the frame A' and is supported along its sides.

The solution of the above mentioned problems is achieved by means of this alternative device in the same way as discussed previously, the only difference being that rotational movement is here replaced by rectilinear movement.

Utilisation of the output indicator

All machining problems arising in connection with any one of the machines used for the removing of material, with the exception of grinding machines, can be solved by means of the present device, with respect to every kind of material which can be machined, and with respect to tools of every conceivable form and composition. The device can be used also in office work for the preparation of the work and calculation of time, by the foremen and by the workmen, in order to ensure the best possible output of the machines and efficient utilisation of the tools.

This device which has a mathematical basis, makes it possible to solve not only problems connected with machining by means of machine tools, but also the solution of all problems in space characterised by several dependent or independent variables three of which at least have to solve simultaneously two different laws, the solution being effected directly and very quickly, without recourse to any auxiliary calculation in order to obtain the desired results.

It should be noted however that the graduation and the composition of the scales has to be adapted to the character of the problem to be solved.

What is claimed is:

1. In a device for indicating performance of machine tools, a base plate having several circular graduations, a disc rotatable on said base plate having a circular graduation and counting lines arranged within said graduation, a number of graduated rule bars sliding one in another and rotatable together about an axis parallel to but different from the axis of rotation of said disc, one of said rule bars having a radial index cooperating with said counting lines and another of said rule bars having an index cooperating with a circular graduation of said base plate, another circular graduation of said base plate cooperating with said circular graduation on said disc.

2. A device according to claim 1, wherein said counting lines consist of two families of intersecting curves, the points of intersections defining a curve of predetermined characteristic.

3. A device according to claim 1, wherein one of the circular graduations of said base plate is arranged along the periphery of the rotary disc and the other of said circular graduations is arranged outside of said periphery.

4. A device according to claim 1, wherein said base plate has a circular graduation along the periphery of the disc representing machine speed and another circular graduation representing depths of cut, and wherein said disc has a circular graduation along its periphery representing powers of production; the counting lines representing curves of proper use of tools and total utilization of power; there being three rule bars sliding one in another having graduations representing respectively co-efficients characteristic of the tools, speeds and machine time, the outermost bar being arranged to support the two inner bars, with the index of the outermost bar cooperating with said circular graduation representing depths of cut, and the index of the innermost bar cooperating with said curves.

5. A device according to claim 1, wherein said base plate has a circular graduation along the periphery of the disc representing machine speed and another circular graduation outside of said periphery characteristic of the metals worked upon, and wherein said disc has a circular graduation along its periphery representing powers of production, and inside said periphery two families of curves intersecting in points of a predetermined characteristic curve and representing proper use of tools and total utilization of power; there being three rule bars sliding one in another having graduations representing respectively co-efficients characteristic of the tools, speeds and machine time; the outermost bar being arranged to support the two inner bars with the index of the outermost bar cooperating with said outside circular graduation, and the innermost bar cooperating with said inside curves.

6. In an output calculator for machine tools, a stationary base part having at least one graduation, a second part movable on said base part and having a graduation and counting lines, and a set of graduated rule bars movable relative to each other and movable as a unit with respect to said base part and at an angle with respect to the movement of said second part; at least one of said rule bars having an index cooperating with said counting lines; said graduation on said base part cooperating with said graduation on said movable part.

7. In an output calculator for machine tools, a stationary base part having at least one graduation, a second part movable on said base part and having a graduation and counting lines, and a set of graduated rule bars movable relative to each other, supported on said base part and movable as a unit with respect to said base part; the relative movement of said rule bars and the movement of said second part being linear movements at an angle with each other; at least one of said rule bars having an index cooperating with said counting lines; said graduation on said base part cooperating with said graduation on said movable part.

8. In an output calculator for machine tools, a stationary base part having at least one graduation, a second part movable on said base part and having a graduation and counting lines; and a set of graduated rule bars movable relative to each other, rotatably supported on said base part and movable as a unit with respect to said base part and said second part; the relative movement of said rule bars being a linear movement and the movement of said second part being a rotary movement; at least one of said rule bars having an index cooperating with said counting lines; said graduation on said base part cooperating with said graduation on said movable part.

9. In an output calculator for machine tools, a stationary base part in the form of a quadrangular plate having at least one graduation, a second part movable on said base part in a direction parallel to a diagonal of said quadrangular plate, and having a graduation and counting lines, and a set of graduated rule bars supported on said base part and movable with respect to said base part and said second part; said set of rule bars being movable as a unit parallel to one side of said quadrangle and the individual rule bars being movable parallel to an adjacent side of said quadrangle; at least one of said rule bars having an index cooperating with said counting lines; said graduation of said base plate cooperating with said graduation of said movable part.

10. In an output calculator for machine tools, a stationary base part having several graduations, a second part movable on said base part and having a graduation and counting lines, and a set of graduated rule bars movable relative to each other and movable as a unit with respect to said base part; said set of rule bars including two rule bars one movable with respect to the other and each having an index; the two indices being aligned with each other, one of said indices cooperating with said counting lines and the other of said indices cooperating with a graduation on said base part; another graduation of said base part cooperating with said graduation of said movable part.

11. In an output calculator for machine tools, a stationary base part having several graduations, a second part movable on said base part and having a graduation and counting lines, and a set of graduated rule bars movable relative to each other and movable as a unit with respect to said base part; said set of rule bars including three rule bars slidable with respect to each other, the innermost and outer scale bars each having an index cooperating respectively with said counting lines and a graduation on said base part; another graduation on said base part cooperating with said graduation on said movable part.

12. In an output calculator for machine tools, a stationary base part formed as a plate having at least one circular graduation, a second part supported thereon and formed as a disc concentric with and rotatable with respect to said circular graduation; said second part having a circular graduation and at least one calculating graph; and a set of graduated rule bars movable relative to each other and supported on the base plate rotatable as a unit with respect to said base plate; at least one of said rule bars having an index passing through a point eccentric with respect to said disc and cooperating with said calculating graph; said circular graduation on said base plate cooperating with said circular graduation on said disc.

13. Device according to claim 9 comprising a logarithmic graduation representing depth of cut on one side of the quadrangle, a characteristic of coefficients of metals on the edge of said second part; there being provided on said second part one calculating graph formed of parallel lines representing advance and a second calculating graph representing machine production and also formed of parallel lines, said two series of parallels intersecting in a characteristic line of intersection, and a logarithmic graduation traced upon the second part representing production power.

References Cited in the file of this patent

UNITED STATES PATENTS

| 1,200,569 | Young | Oct. 10, 1916 |
| 1,429,463 | Squyer | Sept. 19, 1922 |
| 1,881,165 | Becker | Oct. 4, 1932 |
| 2,193,280 | Gunning | Mar. 12, 1940 |
| 2,247,531 | Thurston et al. | July 1, 1941 |
| 2,434,306 | Wood | Jan. 13, 1948 |
| 2,544,224 | Hackmuth | Mar. 6, 1951 |

FOREIGN PATENTS

| 506,039 | Great Britain | May 18, 1938 |
| 564,407 | France | Oct. 18, 1923 |

OTHER REFERENCES

"Elementary Mathematical Analysis," page 387, by Young and Morgan, published by The MacMillan Company of New York in 1918.